United States Patent [19]

Trocellier et al.

[11] 4,315,690
[45] Feb. 16, 1982

[54] ARRANGEMENT FOR LOCATING RADIATING SOURCES

[75] Inventors: Roger Trocellier; Jean C. Reymond, both of Paris, France

[73] Assignee: Thomson-CSF, Paris, France

[21] Appl. No.: 123,816

[22] Filed: Feb. 22, 1980

[30] Foreign Application Priority Data

Feb. 27, 1979 [FR] France .................................. 79 05004

[51] Int. Cl.³ ............................................. G01B 11/26
[52] U.S. Cl. .............................. 356/152; 250/203 R; 356/141
[58] Field of Search .............................. 356/141, 152; 250/203 R

[56] References Cited

U.S. PATENT DOCUMENTS

| | | | |
|---|---|---|---|
| 3,205,361 | 9/1965 | Albus | 250/203 R |
| 3,263,088 | 7/1966 | Goldfischer | 356/141 |
| 3,558,230 | 1/1971 | Fowler | 356/152 |
| 3,751,169 | 8/1973 | Fornerod | 356/141 |
| 3,790,276 | 2/1974 | Cook et al. | 356/152 |
| 3,951,550 | 4/1976 | Slick | 356/141 |
| 4,092,072 | 5/1978 | Ellis | 356/141 |
| 4,193,689 | 3/1980 | Reymond et al. | 356/141 |
| 4,209,254 | 6/1980 | Reymond et al. | 356/141 |

FOREIGN PATENT DOCUMENTS 2388250 12/1978 France ................................ 356/152
1520154 8/1978 United Kingdom .

OTHER PUBLICATIONS

Hooker, IBM Tech. Discl. Bulletin, vol. 19, No. 9, 2-1977.

Primary Examiner—S. C. Buczinski
Attorney, Agent, or Firm—Cushman, Darby & Cushman

[57] ABSTRACT

A radiation sensor for determining the angular location of a light source and locating a direction defined by a plurality of sources fastened to a movable structure such as a helmet-mounted sight visor. The sensor comprises a housing with an optical mask which is provided with transparent zones of circular shape, with the result that the omnidirectional radiation transmitted by a point source is confined within a cone. Radiation-detecting means constituted by linear arrays of photosensitive elements are disposed in a plane parallel to the mask so that the center of the projected circle corresponding to the angular direction of the source is determined by the positions of sensitized elements of the detecting strips.

9 Claims, 9 Drawing Figures

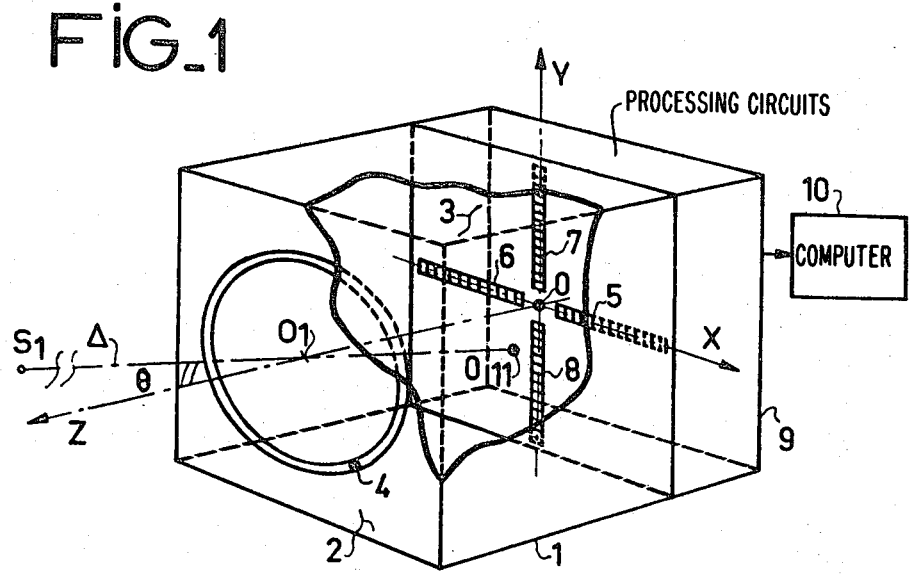
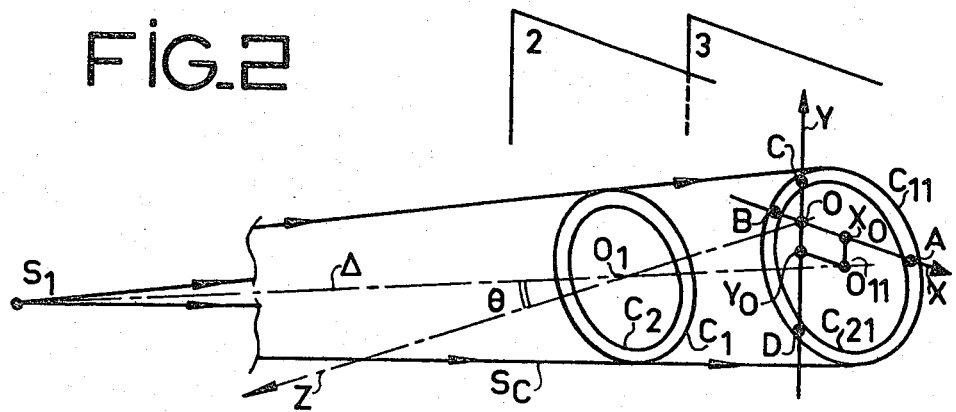
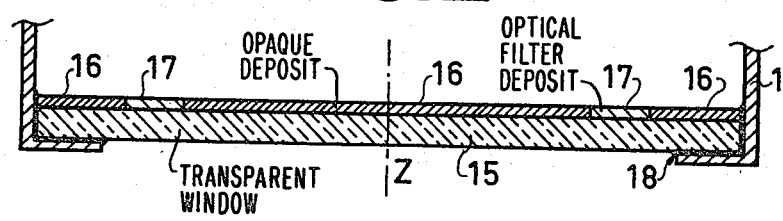

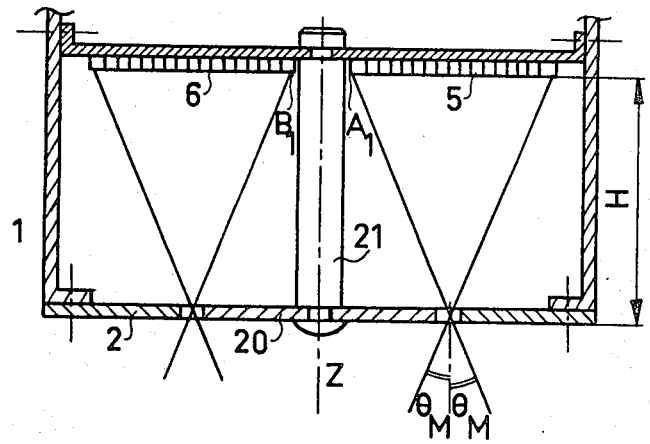
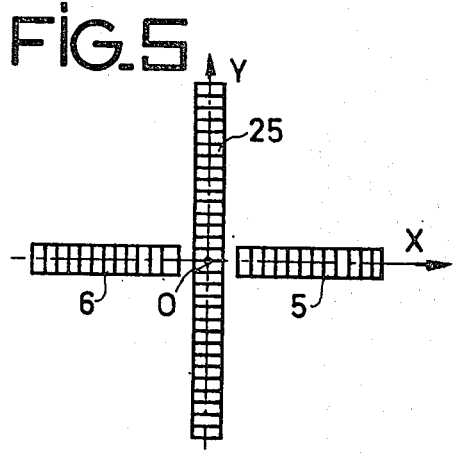
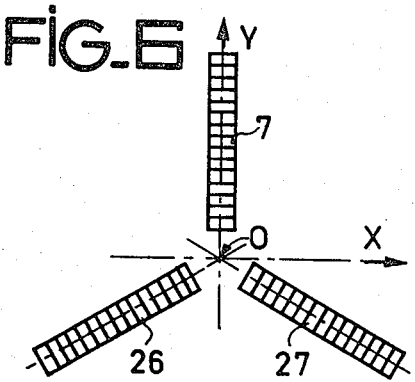
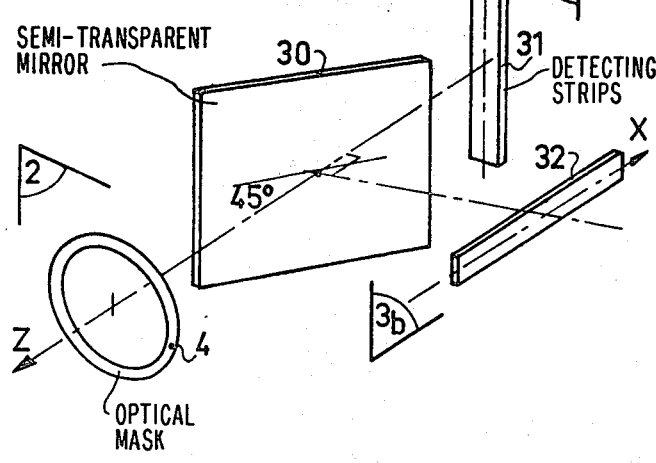

ARRANGEMENT FOR LOCATING RADIATING SOURCES

This invention relates to an arrangement device for locating a radiation source and determining the direction of a point source with respect to the device, or in other words, for determining the angular location of the source. The invention is primarily applicable to the production of direction-finding systems, in particular, helmet sight-visor systems.

One example of a known technique in this field may be found in U.S. Pat. No. 3,951,550 which describes a device for determining the angular location of a point source of light comprising an optical mask or cover at the front end of a housing, linear arrays of photosensitive elements being disposed in the bottom portion of said housing in a plane parallel to that of the cover. Said cover is provided with transparent zones in the form of linear slits in order to define the radiation from the source in at least two secant planes, the line of intersection of which passes through the radiation-emitting source. Each slit is associated with a linear detecting array which is positioned at an angle with respect to the slit and preferably at right angles to said slit. Thus the points of intersection of the planes with the strip radiation detectors make it possible to determine by computation the position of the line of intersection of the planes or in other words the angular location or direction of the source with respect to the device. Circuits for processing signals detected by the strip detectors serve to identify the positions of sensitized elements corresponding to the points of intersection and associated computing circuits process data relating to the angular displacement of the radiation source. When employed in conjunction with a number of point sources associated with a movable structure such as a pilot's helmet (the sources being supplied separately and sequentially), the device permits practically instantaneous computation of the spatial positions of sources and consecutive computation of the direction of an axis associated with the movable structure, namely the sighting direction in the application to a helmet sight-visor.

One aim of the invention is to provide a sensor for angular location of a point source of light which also combines an optical mask with radiation-detecting strips and in which these elements are so arranged that the direction of the source does not result from the intersection of planes but corresponds to the axis of a cone having the source as its vertex. The different method employed is conducive in particular to considerably simplified computation, to a degree of reliability which can be enhanced by complementary computational checks and to maintenance of accuracy of measurement.

A further aim of the invention is to provide a sensor for spatial location of a radiation source by employing a plurality of angular-location devices so that the source constitutes the common point of the computed directions of angular displacement.

Yet another aim of the invention is to provide a direction-finding system comprising one or a number of angular-location sensors for determining a direction defined by means of a plurality of radiation sources.

According to a distinctive feature of the invention, a radiation point source is located by means of a device comprising a housing in which a front face forms an optical mask for admitting radiation from the source solely along transparent zones of predetermined shape. The device further comprises an assembly constituted by linear arrays of photosensitive elements disposed in a plane parallel to the optical mask at the inner end of the housing, circuits for processing the signals detected by said linear arrays and for identifying the positions of elements sensitized by the radiation transmitted through the mask, and means for computing the source location from photosensitive-element position identifications. In said source-locating device, the transparent zones define at least one circular shape so that the transmitted radiation is internal to a cone having the source as its vertex and applied against said circular shape. The radiation-detecting arrays are so determined as to intercept at least three points of the projected circle corresponding to the circular shape and to deduce therefrom by computation the coordinates of the corresponding center and the angular location of the source.

Other features of the invention will be more apparent to those skilled in the art upon a consideration of the following description and accompanying drawings wherein:

FIG. 1 is a diagram of an arrangement according to the invention for locating a radiation source;

FIG. 2 is a diagram relating to the operation of the device according to FIG. 1;

FIG. 3 illustrates one example of an embodiment of the optical mask;

FIG. 4 illustrates one example of an embodiment of the locating device according to FIG. 1;

FIGS. 5 and 6 illustrate examples of an embodiment of the radiation-detecting arrays;

FIG. 7 is a simplified diagram of a preferred design solution for providing a radiation sensor according to the invention;

Figure 8:
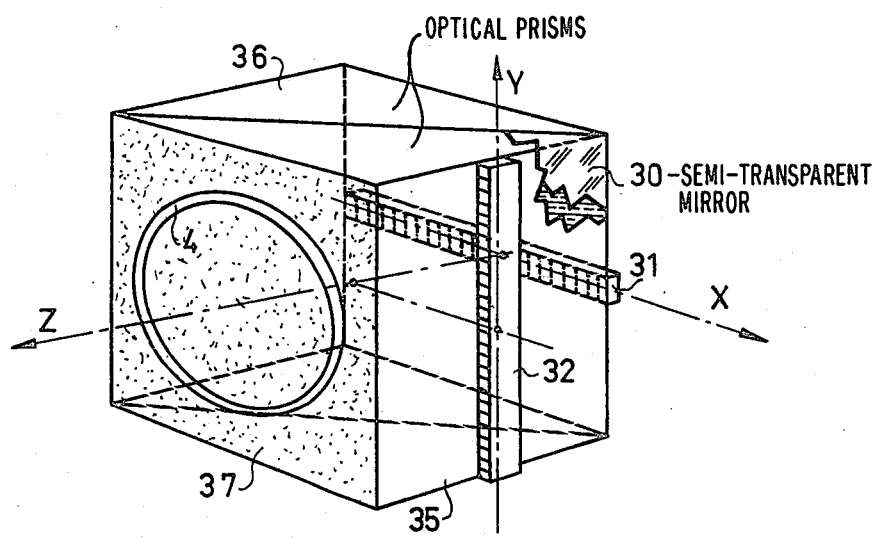
FIG. 8 illustrates one example of an embodiment of the sensor according to FIG. 7.

Referring now to FIG. 1 which corresponds to a preferred example of construction, the radiation sensor comprises a housing 1 for isolating the radiation-detecting strips from ambient radiation. The housing has two flat and parallel faces 2 and 3 and can be of parallelepipedal shape as shown in the figure. The front face 2 is provided with transparent zones 4 in order to form an optical mask and to admit external radiation only at the level of said zones. The transparent zones 4 define a circular ring having a center $O_1$; however, this shape is not limitative, as will be noted afterwards. The rear face 3 which is parallel to the front face 2 and located at the inner end of the housing is adapted to carry the detecting portion formed of linear arrays of photosensitive elements. Provision is made for four radiation-detecting strips placed in two reference cartesian directions for measurement along the axes O-X and O-Y and the center O corresponds to the projection of the center $O_1$ on the face 3; two radiation-detecting strips 5 and 6 are disposed along the axis O-X at an equal distance from the center O and two other strips 7 and 8 are disposed along the axis O-Y at an equal distance from the center O. As in the case of the transparent zones mentioned earlier, the strip configuration illustrated should not be considered as implying any limitation.

The axis $O-O_1$ corresponds to the cartesian direction Z of zero angular displacement or null position, measurement of angular location being made with respect to said null position. The radiation-detecting strips can be designed in the form of CCD circuits (charge-coupled devices). The circuits for processing detected signals and for photosensitive-element position identification can be constructed in the form of solid-state circuits of small size which are incorporated in the bottom end-wall of the housing at 9 behind the strip-supporting face 3. The circuits 10 for computing the value of angular displacement from photosensitive-element position identifications are situated at a distance and can form part of an auxiliary computer. Selection of the useful radiation (or in other words radiation from the source to be located) is produced in known manner by employing sources which emit radiation within a narrow spectrum corresponding to the range of detection of the photosensitive strips. In the case of CCD detectors, for example, the spectral range of operation can be within the infrared region. There is no objection to the complementary use of optical filtering on the path of the transmitted rays.

The method employed according to the invention will be apparent from FIG. 2. The useful radiation emitted by the remotely-situated point source $S_1$ and transmitted through the optical mask 2 is confined within a cone $S_C$ having a vertex $S_1$ and applied against the outer contour $C_1$ of the transparent ring 4. The circle $C_1$ is projected on the detection plane 3 so as to form a homothetic circle $C_{11}$. The same applies to the circle $C_2$ constituting the inner contour of the ring and projected so as to form the circle $C_{21}$. Postulating that the light ring $C_{11}-C_{21}$ is of small width, the zones of intersection with the radiation-detecting strips along the axes O-X and O-Y are assimilated with point zones at A ($x_1$-O), at B ($x_2$-O), at C (O-$y_1$) and at D (O-$y_2$). The common center $O_{11}$ of the circles $C_{11}$ and $C_{21}$ is situated at the intersection of the axis $S_1$-$O_1$ with the plane 3; this axis corresponds to the direction $\Delta$ of the source $S_1$ with respect to the locating device. The coordinates xo and yo of the center $O_{11}$ can readily be deduced from the coordinates of the points of intersection according to the following algebraic relations:

$$xo = \frac{x_1 + x_2}{2} \text{ and } yo = \frac{y_1 + y_2}{2}$$

which make it possible to define the angular displacement $\theta$ of the direction $\Delta$ with respect to the reference axis Z. It will be noted incidentally that, in the case of a circle which is considered here, any three of the four points of intersection are theoretically sufficient to define the circle by calculation. In the case of another conic such as an ellipse, it is necessary to determine five points of intersection, thereby resulting in a construction of the locating device which is more difficult and more complex as well as in more complex calculations. For these reasons, the circular shape is adopted in order to define the cone $S_F$ of radiation transmitted by the optical mask.

The following FIGS. 3 to 7 relate to different forms of construction of the mask and of the detectors. FIG. 3 is a sectional view of one version in which the optical mask is constituted by a transparent plate 15 having parallel faces. The circular ring 4 is defined by a deposit 16 formed on the outer face of this latter and consisting of material which is opaque to ambient radiation and to radiation from the source. The deposit 16 is obtained by means of known techniques such as photoetching, for example. Another deposit 17 at the level of the transparent ring can be formed of material which constitutes an optical filter for the radiation from the source; the spectral band employed can be in the infrared region, for example. That face of the transparent plate on which the deposits 16 and 17 are formed is oriented towards the interior of the housing as a protective measure. Bonding means 18 such as an adhesive coating serve to secure the periphery of the transparent plate to the housing. The deposits are of very small thickness of the order of a few microns whereas the plate 15 having parallel faces is of greater thickness, especially in the case of a glass plate, in order to satisfy requirements of sufficient mechanical strength. In practice, optical deviation along the axis Z as a result of double refraction as the radiation passes through the plate is negligible unless operation of the device calls for a high standard of accuracy, for a transparent plate of substantial thickness and for a large angle of incidence $\theta$ of the rays. In such cases, correction data can be introduced into the auxiliary computer. A preferred solution consists in reducing the thickness of the transparent plate by making use of a transparent plastic instead of glass. The plate can also be replaced by a zero-convergence meniscus lens. The meniscus lens is divergent and makes it possible to correct the image displacement along the optical axis Z.

FIG. 4 is a central sectional view of a mechanical design of optical mask obtained by machining the ring 4 on the face 2. The circular member 20 which is thus freed is maintained in position by means for attaching said member to the housing, such means being so designed as to ensure that they do not intercept the useful radiation within the intended field of view $\theta_m$. Attachment can be effected by means of a mechanical shaft 21. The distance H between the mask plane and the detection plane is so determined that, in the case of maximum angular values $\pm\theta_m$, the end detection points $A_1$ and $B_1$ are at a distance from the center O (as shown in FIG. 1) in order to free a central zone in which the circular member can be secured to the housing by means of the mechanical shaft 21. Said shaft can also be reinforced by means of ribs disposed for example in the bisecting planes in order to avoid any interference with optical transmission and in order to endow the assembly with enhanced rigidity and resistance to vibrations.

Without any limitation being implied, FIGS. 5 and 6 illustrate two further forms of construction of the linear detectors. According to a first form, three strips are employed, the vertical strips 7-8 being replaced by a single strip 25. The photosensitive-element position identification circuits 9 associated with an assembly of this type are intended to determine in particular the two points C and D of detection on the strip 25. In the second form of construction, the detector unit is constituted by three identical radiation-detecting strips disposed at angular intervals of 120°, namely the strip 7 disposed along the axis Y and the strips 26 and 27. This assembly is less advantageous than an arrangement of detectors along X and Y axes since it provides only three points and therefore does not permit a redundancy check at the level of the computer; furthermore, the computation formulae are more complex.

Further alternative forms of construction may be contemplated for the optical mask and the detectors. Thus the single circular slit 4 can be replaced by a plurality of concentric rings or else it can be widened up to the center $O_1$ (shown in FIG. 1). In the case just mentioned, transparency of the circle limited by $C_1$ (FIG. 2)

can be made radially variable in accordance with techniques which make use of radially-graduated optical attenuators. These solutions nevertheless suffer from one disadvantage among others, and this lies in the fact that they complicate the processing of detected signals. Under conditions of uniform light distribution or, in other words, when an omnidirectional radiation source is considered, the hereinabove described solution of a single transparent ring appears preferable by reason of simplicity of construction, of processing and of computation. In regard to the detectors, it is difficult in practice to construct an assembly as shown in FIG. 1 with only two detecting strips oriented respectively along the X and Y axes by reason of their situation in two juxtaposed planes with superposition in the central zone. An assembly consisting of two detecting strips is made possible in accordance with a preferred alternative form of construction described hereinafter with reference to FIGS. 7 and 8.

As shown in the schematic diagram of FIG. 7, a semi-transparent mirror 30 is interposed on the optical path between the mask plane 2 and the detection plane 3a in order to form a second detection plane 3b by reflection. The selected value of transmission of the mirror is 0.5 in order to equalize the light energy which is split-up by the mirror and distributed towards the planes 3a and 3b. The angle of inclination of the mirror with respect to the axis Z is preferably equal to 45°, with the result that the planes 3a and 3b are perpendicular. Each plane can contain a single detecting strip. One strip 31 is oriented, for example, in the reference direction Y and the second strip 32 is oriented in the second direction, namely along the X-axis as seen by reflection from the mirror.

FIG. 8 shows a preferred embodiment of the assembly according to FIG. 7, this assembly being designed in the form of a single-unit cube in which two prisms 35 and 36 are mounted with their large faces in contiguous relation. One of the large faces is treated with a deposit so as to constitute the semi-reflecting plane mirror 30. The treatment can also comprise a layer which forms an optical filter for efficient operation. The small face 37 of the prisms 35 is treated so as to form the optical mask as described earlier with reference to FIG. 3. As thus constituted, the cube is provided with two detecting strips 31 and 32 and mounted within a housing (not shown in the figure); the cube face 37 constitutes the front radiation-receiving face. The prisms are formed of transparent material such as glass or plastic.

The processing circuits 9 for position-identification of the photosensitive elements are considered to be constructed according to known techniques by employing CCD reading circuits and by carrying out counting operations.

Figure 9:
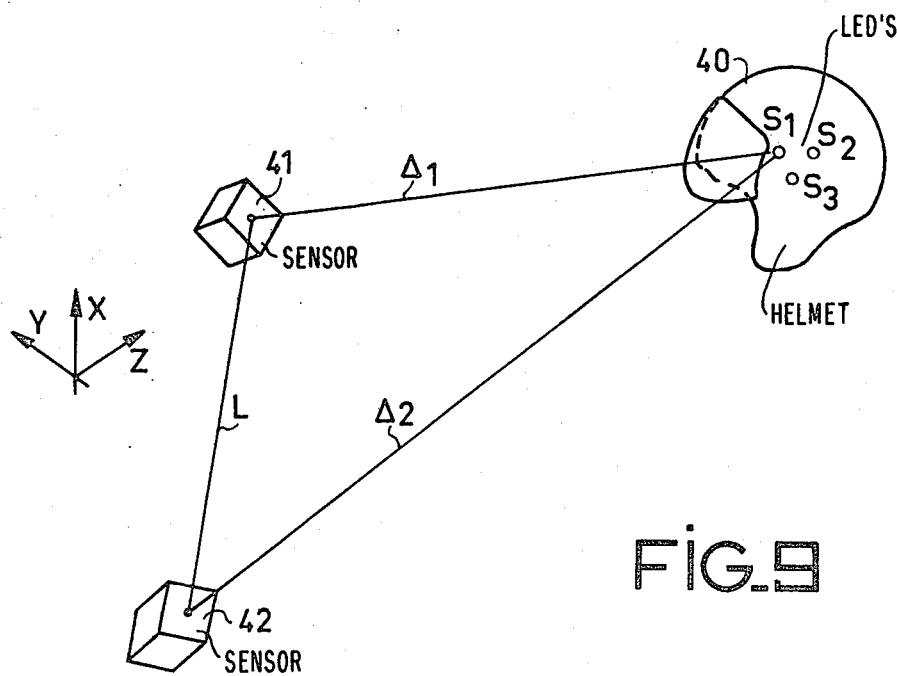
FIG. 9 is a diagram relating to utilization of a plurality of radiation sensors according to the invention.

Relevant information can be obtained in particular from U.S. Pat. Nos. 4,193,689 and 4,209,254 which describe circuits of this type as well as the application to a direction-finding system such as a helmet sight-visor, and the duplication of locating devices or sensors which permit enhanced fineness of measurement by triangulation. In an alternative form of construction which is preferred in connection with a direction-finding system, each group of at least three diodes constituting point sources is associated with two sensors. A corresponding arrangement is recalled in the schematic illustration of FIG. 9. The sensors 41, 42 are attached to a structure represented by the trihedron XYZ and the sources $S_1$, $S_2$, $S_3$ are fixed on the movable structure 40. The distance L between the sensors is known and the positions of these latter are also known. The directions $\Delta 1$ and $\Delta 2$ are obtained by computation. The source $S_1$ is placed at the intersection of the straight lines or sides $\Delta 1$ and $\Delta 2$ of the triangle L, $\Delta 1$, $\Delta 2$. The spatial determination can be checked by redundancy while observing that one of the directions, namely $\Delta 1$ for example, determines with the abscissa $X_O$ of the center of the projected circle (shown in FIG. 2) a first plane parallel to Y and with the ordinate $Y_O$ a second plane parallel to X and that the intersection of the second direction $\Delta 2$ with each of these planes corresponds to the source point $S_1$.

The locating device hereinabove described and combined with a plurality of point sources thus permits continuous location of a direction of axis of the movable structure 40 which carries the sources. The use of a plurality of locating devices permits spatial location of a source considered as constituting the common point of the corresponding directions of angular displacement $\Delta$ as identified by computation.

A locating device according to the invention offers a number of advantages including simplicity of construction. One advantage which is worthy of note lies in the fact that complex computation of at least two planes and of their intersection can be replaced by determination of the center of a circle by means of two summations.

We claim:
1. A sensor system for the location of radiation sources, comprising:
   a housing provided with a front face forming an optical mask for admitting radiation from a source solely along transparent zones which define at least one circular shape, the transmitted radiation being consequently confined within a cone which has the source as its vertex and said circular shape as a section, said housing carrying a plurality of linear arrays of photosensitive elements disposed in an inner plane within said housing parallel to said optical mask to intercept at least three points of the projected circle corresponding to the said circular shape;
   circuit means for processing the signals detected by said linear arrays and for identifying the positions of elements sensitized by the radiation transmitted through the optical mask; and
   ancillary means for computing from photosensitive-element position identifications the coordinates of the said points and to deduce therefrom the coordinates of the center of the projected circle and consequently the angular location of the source.

2. A sensor system according to claim 1, wherein the transparent zones define a circular ring.

3. A sensor system according to claim 1, wherein said system comprises further into the said housing a semi-reflecting plane mirror interposed on the optical path between the mask and the said inner detection plane to reflect partly said radiation towards a second plane which is symmetrical with said detection plane with respect to the mirror, said linear radiation-detecting arrays being constituted by two detecting strips which are disposed respectively along two reference cartesian axes and one of which is placed in each detection plane.

4. A sensor system according to claim 3, wherein said mirror is constituted by means of a cube of transparent material formed by two prisms mounted with two faces inner to the cube in contiguous relation and one of them treated to form the said semi-reflecting mirror, one face of said cube being treated to form the optical mask, two other faces of the cube constituting the said detection planes respectively.

5. A sensor system according to claim 1, wherein the linear detecting arrays are formed of four detecting strips arranged in pairs along two reference cartesian axes at equal distance from the center of said axes.

6. A sensor system according to claim 1, wherein the linear detecting arrays are formed by three detecting strips, one strip being disposed in a first reference direction and the other two strips being disposed in a second reference direction at right angles to the first.

7. A sensor system according to claim 1, wherein the linear detecting arrays are formed by three detecting strips disposed respectively in three directions at 120° with respect to each other.

8. A sensor system according to claim 1, wherein the optical mask is constructed in the form of a plate having parallel faces of transparent material with a deposit of material which is opaque to ambient radiation and to radiation from the source, said deposit being formed on one of the faces so as to cover the surface which is external to the transparent zones, said zones being in turn covered with a deposit of material which forms an optical filter for the radiation from the source.

9. A sensor system according to claim 4 as applied to a helmet sight-visor, wherein the transparent zones define a circular ring and are covered with a deposit forming an optical filter for radiation from the source, said helmet sight-visor comprising a group of at least three electroluminescent diodes placed on a movable structure constituted by the helmet.

* * * * *